2 Sheets—Sheet 1.
W. H. WARD.
Car Brake.
No. 201,313. Patented March 12, 1878.
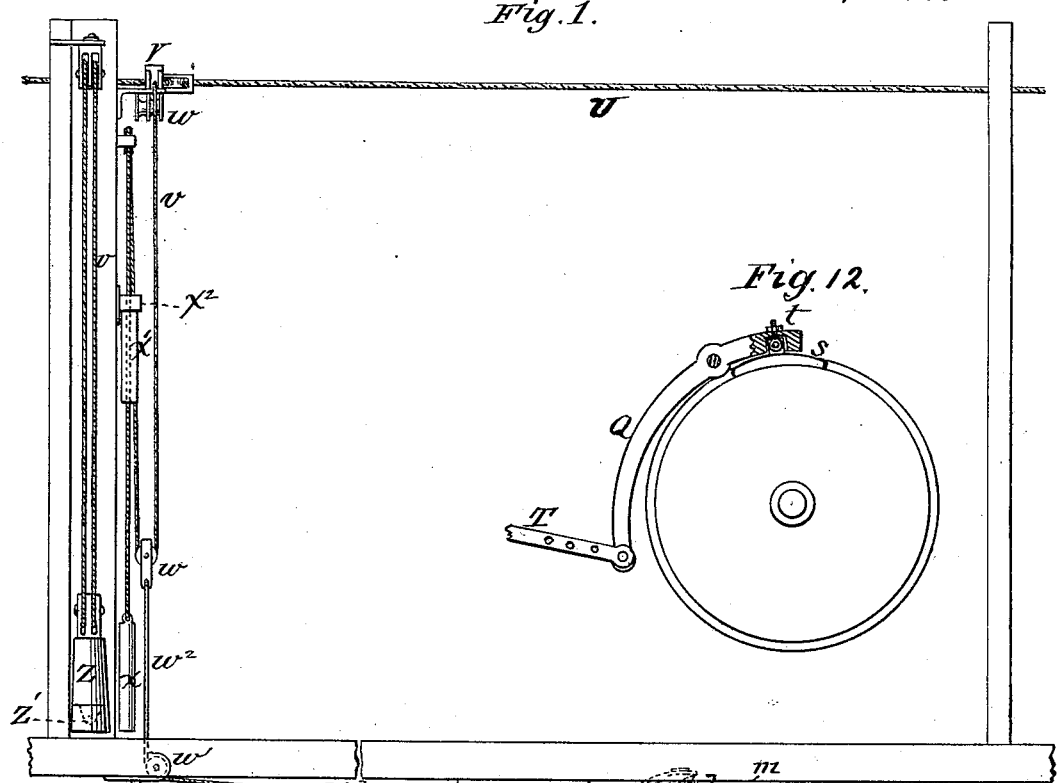
Fig. 1.
Fig. 12.
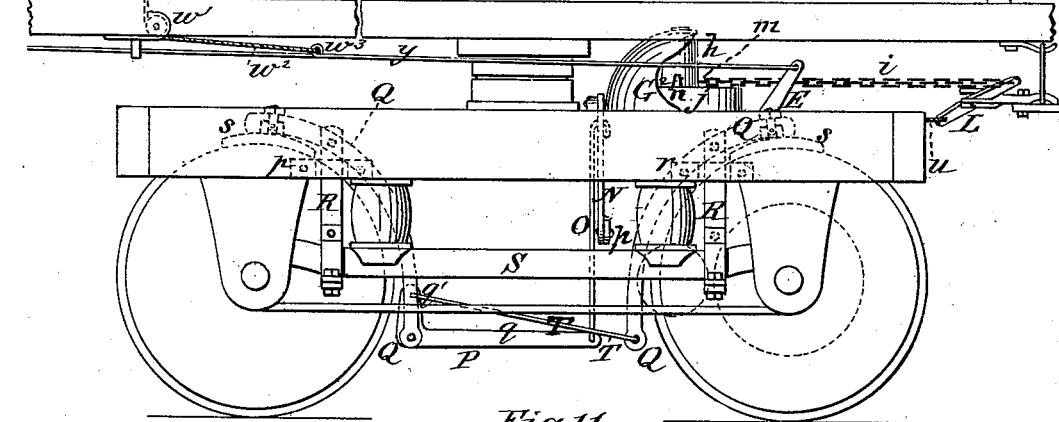
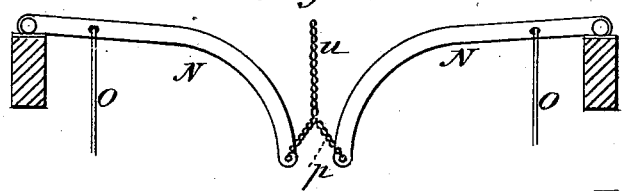
Fig. 11.
Witnesses
Floyd Norris.
A. P. Cowl
Inventor:
William Henry Ward
by Johnson & Johnson
Attys
N. PETERS, PHOTO-LITHOGRAPHER, WASHINGTON, D. C.

2 Sheets—Sheet 2.
W. H. WARD.
Car Brake.
No. 201,313. Patented March 12, 1878.
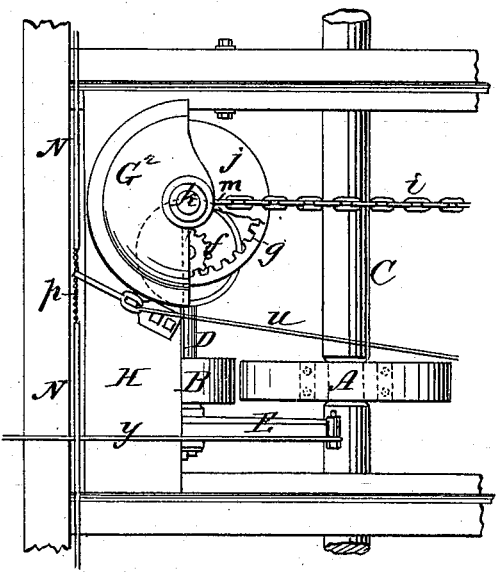
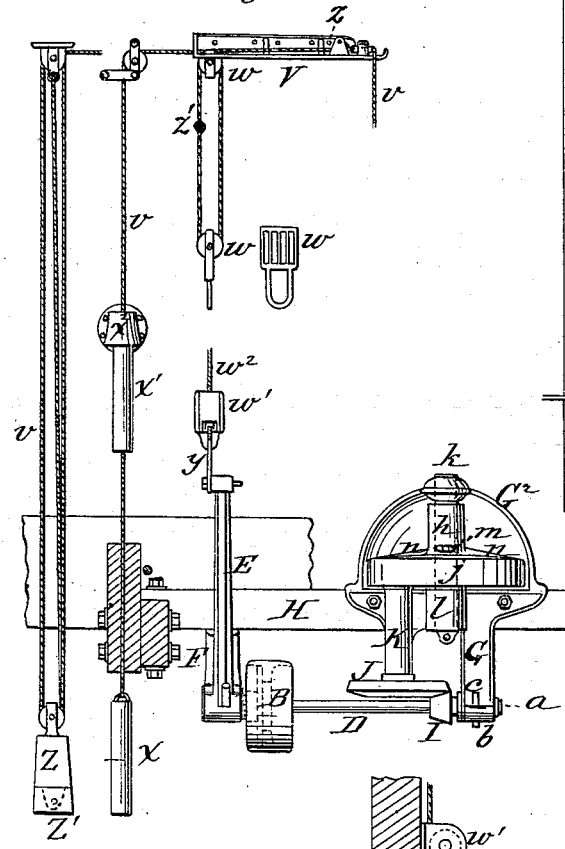
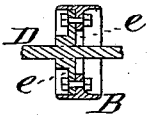
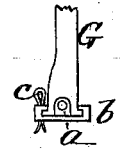
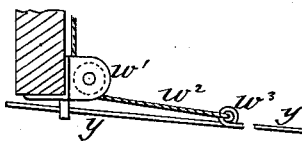
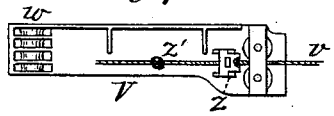
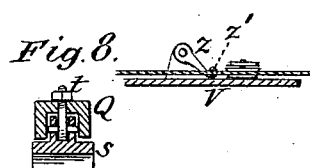
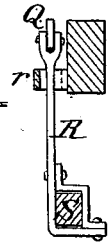
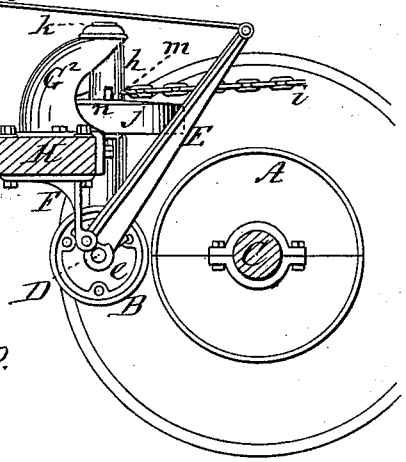
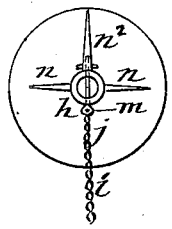
Witnesses:
Floyd Norris.
D. P. Cowl.
Inventor:
William Henry Ward
by Johnson & Johnson
Attys
N. PETERS, PHOTO-LITHOGRAPHER, WASHINGTON, D. C.

UNITED STATES PATENT OFFICE.

WILLIAM H. WARD, OF AUBURN, NEW YORK.

IMPROVEMENT IN CAR-BRAKES.

Specification forming part of Letters Patent No. 201,313, dated March 12, 1878; application filed September 1, 1877.

*To all whom it may concern:*

Be it known that I, WILLIAM HENRY WARD, of Auburn, in the county of Cayuga and State of New York, have invented certain new and useful Improvements in Friction Power-Brakes; and I do hereby declare that the following is a full, clear, and exact description thereof, which will enable others skilled in the art to which it appertains to make and use the same, reference being had to the accompanying drawings, and to letters of reference marked thereon, which form a part of this specification.

The brake is adapted to utilize the momentum and force of the train to stop itself. I use a friction device consisting of an axle, driving-wheel, and a leading wheel, carried by a controlling-lever, and operating in a manner to bring its periphery in contact with that of the driver, so that when the brakes are applied the endwise movement of the axle will not interfere with the working of the brake. One of these friction-wheels is operated by means of the train-cord, and is carried by an arbor movable at one end, and which end has a work-lever attachment connecting with the train-cord, while the other end of said arbor has suitable gear-connections with a winding device, which has a chain-connection with the brake devices.

The winding device is adapted to wind and unwind the chain upon the vertical hub of a disk inside gear-wheel, which prevents the chain, when slack, from fouling the gears. The upper or chain side of the disk is provided with radial ribs of varying height, in a manner to act upon and give the chain a spiral form upon the hub while being wound in either direction.

The train or bell cord connection with the brake is effected by means of a branch line and pulley arrangement and eyed rod, which joins the friction-wheel lever by a flexible connection. A suitable weight is provided for each brake on each ear, and is attached to one end of said branch line, the other end of which line is connected, at pleasure, to the train or bell cord. The weights of each car are graduated to suit the weight of their respective cars, and by means of these graduated weights I am enabled to compensate for the slack between the cars of the train, and to put a greater braking force onto heavy cars and a lesser brake force on a lighter car in the same train.

In connection with the branch line I use a forked pawl, which allows freedom for the branch line, as the train-cord is operated, to pass in either direction through the fork of said pawl so long as the train-cord is intact; but, in the event of the accidental braking of the train, a knot or enlargement on said branch cord will be drawn against said pawl, and, lifting it, will pass to its other side, and become locked with the pawl at the time the branch line is broken at its connection with the train-cord, and thus retain the brakes in full force.

For freight-trains these weights will be increased in weight, and adapted with increased pulley-connections for a greater degree of slack usual in freight-trains.

To avoid pressure and friction upon the axles, I apply the brake-shoes on the top of the wheels. The devices and connections for effecting this consist of a bent lever, jointed to the shoe, and connected at its lower end to an elbow-lever, which connects with the bent lever of the other pair of wheels, so that by a cross-lever a connection is made with the long arm of said elbow-lever, the brakes at the opposite side of the truck, and to the evener-bar of the winding device.

In the drawings, Figure 1 represents a side elevation of a portion of a railway-car embracing my improvements in railway-brake devices; Fig. 2, a sectional elevation, looking from the middle of the car, showing the friction-applying devices with the manipulating-cord connections; Fig. 3, a top view of the friction-applying devices; Fig. 4, a sectional end elevation of the same; Fig. 5, a detail of the lever friction-wheel; Fig. 6, a detail of the bearing-box of the friction-wheel arbor; Fig. 7, detail views of the branch line pawl and pulleys; Fig. 8, a detail of the brake-shoe connection; and Fig. 9, a detail of the axle, evener-bar, and brake-lever connection; Fig. 10, a top view of the winding-wheel, showing the radial ribs for preventing the winding-chain from lapping upon the hub; Fig. 11, a section, showing the connection of the cross-levers which connect with the winding device; and Fig. 12, the brake-shoe applied to the top of the car-wheel.

The brake appliances of each car are independent of each other, and are only connected by means of the train or bell cord as the train is made up.

The friction device proper consists of two rolling friction-wheels, A and B, one of which, A, is secured to one of the truck-axles C of the car, and the other, B, is mounted upon an arbor, D, one end of which has its bearing in a lever, E, which is pivoted to an adjustable hanger, F, in such way as to allow freedom of action to engage and disengage the friction-wheels. The other end of this arbor D has its bearing in a box, $a$, Fig. 6, in the lower end of a frame, G, which, with the hanger F, are secured to a bridge-timber, H.

This box is arranged in an arched groove at the bottom of said frame, and is secured in position by means of a bottom hook-flanged plate, $b$, and key $c$, the plate-flanges fitting over corresponding flanges projecting from the frame.

This construction allows of the ready removal of the arbor to replace the chilled rim of the friction-wheel, the web or hub $e$ for which is adapted to receive and support the chilled rim, and secure it by screw-bolts or otherwise, as shown in Fig. 5. This construction affords facility for renewing the chilled face B. The arbor D carries, near its fixed end, a bevel-pinion, I, Fig. 2, into which meshes a bevel-wheel, J, on the lower end of a vertical shaft, supported in a sleeve-bearing, K, which shaft carries a spur-pinion, $f$, Fig. 3, at its upper end, which drives, by an internal gear, $g$, the winding-hub $h$ of the ribbed disk-wheel $j$, to the hub of which the brake-chain $i$ is attached in a manner to be wound in either direction thereon when the friction-surfaces are brought in contact. This chain-winding wheel $j$ is secured to the frame G by a vertical headless pin, $k$, which passes through the top arched end $G^2$ of said frame G, the hub $h$ of said wheel, and a seat-bearing, $l$, Fig. 2, below, and is retained in position by means of a cross-pin, $m$, which also serves to connect the chain $i$ with the winding hub or barrel. The arch or hood $G^2$ serves as a partial housing to said wheel, as well as its support and bearings.

The cross-pin $m$ is kept in position by a cross-key. This construction admits of a ready change of parts, when required.

Radial ribs $n$, Fig. 10, extend from the hub $h$ on the top side of the winding-wheel $j$, the two opposite ones, $n\, n$, being of equal elevation, while the third or middle one, $n^2$, is of greater elevation, which gives to the winding-chain a worm winding around the hub whichever way the wheel may turn, and thereby prevents the chain overriding while winding.

The winding-chain $i$ connects with one end of an ordinary brake-evener bar, L, Fig. 1. The other end of said evener-bar is connected to a flexible coupling, $u\, p$, Figs. 1, 3, and 11, which unites the inner ends of two cross-levers, N, the outer ends of which are secured to the frame of the truck, as shown in Fig. 11, Sheet 1.

From each of these cross-levers N a rod or chain, O, depends, and connects with the long arm $q$ of an elbow-lever, P, Fig. 1, pivoted to the lower end of one of the brake-shoe levers Q, while the short end $q'$ of said elbow-lever P is connected to the lower end of the other brake-shoe lever Q, so that the raising of the cross-levers N by the winding-hub $h$ of wheel $j$ brings the lower ends of the brake-shoe levers together, and applies the brake-shoes to the treads of the wheels.

The supports R, Figs. 1 and 9, for the brake-shoe levers Q are strapped and strongly secured to the axle-bearing evener-bar S in a manner to carry the shoes in positions to act upon the top of the wheels, so as to put the pressure upon the wheels, and not upon the axle bearings and boxes.

In this construction the brake-shoe levers Q are pivoted to the upper end of standards R, the lower ends of which are strapped and firmly secured near the ends of the axle-bearing evener-bar, as shown in Fig. 9. This gives the advantage of maintaining an equal distance between the center of the wheel and the fulcrum of the brake-shoe lever.

The standards are retained in vertical positions and braced laterally by passing through loops $r$, Fig. 9, secured to the inner sides of the top truck-frame in such way as to allow vertical freedom only. The levers Q for this purpose are curved, so as to lie over and around a portion of the treads of the car-wheels, and they carry the shoes $s$, at their upper short ends, in positions nearly vertically over the axles. The shoe $s$ is connected to the lever Q by means of an eye-screw joint-bolt, $t$, Figs. 8 and 12, and nut, said eyebolt being jointed to lugs, which fit in a socket in the inner under side of said lever, which allows the shoe to have a proper degree of adjustment, and makes a strong connection.

The lower or long arm of the lever Q extends down a suitable distance, and connects, by means of a rod or bar, T, extending from one lever, to the vertical short arm $q'$ of the elbow-lever P, pivoted to the corresponding end of the other brake-lever, and connected, by its long arm and the vertical rod O, to the cross-lever N, pivoted to the top of the truck-frame, and, curving downward beneath the truck, is connected, by an evener-chain, $p$, to the corresponding end of the cross-lever of the brakes at the other side of the truck, as shown in Fig. 11. The chain or rod $u$, connecting the evener-bar L and cross-levers N, passes over a pulley, or by bell-crank connection, back of the winding-wheel, and connects with the evener-chain $p$ of the cross-levers N, so that these levers are raised uniformly, and with them the long arms of the elbow-levers P, and thus, by their short arms $q'$ and elbow-connections, draw the two long ends of the brake-lever Q together, and pull down their shoes $s$ upon the treads of the wheels.

The brakes thus described, and connected to the winding device, are operated and controlled, as to their being put on, the degree of their pressure, and their release, by means of the train-cord U, Fig. 1, giving the engineer or train official complete control over the brakes of the train. The train-cord has a direct connection with the friction-brake lever E by means of a branch line, $v$, and rod, said branch line passing over and through pulley-blocks $w$, supported at the end of the car. This branch line $v$ has both its ends free for movement, one of which is to be connected with the train-cord when the train is made up, and the other end carries a weight or weights, $x$, the object of which is to compensate for the slackness between the cars of the train, and to graduate the brake force upon the wheels.

The brake-lever connection with the branch line $v$ is by the lower pulley-block $w^1$ and a cord or chain, $w^2$, passing over said pulley $w^1$ at the bottom of said end of the car, and connects by an eye, $w^3$, with the rod $y$, that operates the friction-wheel lever E.

The weight $x$ of the branch line is made hollow for the purpose of graduating the amount of force required to stop the car without sliding the wheels of an empty car. A supplemental weight, $x^1$, is suspended by a ring-bracket, $x^2$, in position above the graduated weight $x$, and the branch line $v$ passes through this supplemental weight $x^1$, so that the raising of the lower weight beyond the ordinary distance required to stop the train brings the lower weights $x$ in contact with the upper weight $x^1$, and they both then rise together, giving increased brake-force on the wheels of the car corresponding to the increased weight of said supplemental weight. This supplemental weight is a reserve power to be brought into immediate requisition in cases of emergency, or the accidental separation of the train or any portion thereof. This is effected by taking in more of the train-cord. The train-cord U, at the end of the train, has a ring-weight, to which it is attached by ordinary wrapping-twine, so that such attachment may break should the train by accident separate or any one of the cars leave the rails, allowing said train-cord freedom to be drawn through the separated cars from the engine, and thus bring the weights of the separated cars into immediate requisition and apply the brakes. As the train-cord is thus drawn through and operates the brakes, (which is beyond the limit of the engineer's application thereof,) the branch-line knot will be caught and held by a clamp or pawl device, $z$, Figs. 2 and 7, before it is separated from the train-cord, and so on for each car separated from the engine, with their brakes held in rigid brake action, so that this arrangement in case of accidents becomes automatic.

This important advantage is accomplished by having a knot, $z'$, in the branch line $v$, at a certain distance from the weight; and the extra drawing of the cord U, caused by the separation of the train or any part thereof, brings this knot $z'$ in position to pass beneath the prongs or divided end of the pawl $z$, hinged to upward lugs of a bracket, V, having pulleys for the branch line at each end, so that the pawl $z$ will fall behind said knot $z'$, and thus hold the branch line $v$ and prevent the weight $x$ $x^1$ from pulling it back when it becomes broken from the train-cord, the branch line for this purpose being also attached by ordinary wrapping-twine to the train-cord, for the purpose of separation without breaking itself from the train-cord. This clamp or pawl device is arranged at or near the top of the car on a plane at right angles with the train-cord.

The rods or bars T of the several brake-lever connections may have holes, for the adjustment of the shoes to compensate for the wear and renewing of the brake-shoes.

The axle friction-wheel A is made in halves and bolted together upon the axle, which allows of the friction-wheel being renewed when required, as shown in Fig. 4.

The bracket F, which carries the leading friction-wheel B, is secured to the bridge-timbers H by bolts passing through slots in the horizontal arm of said bracket, to allow for wear adjustment of the friction peripheries of the wheels A and B.

As the brake devices of each car are complete and independent, it gives the advantage of enabling the engineer to control the brake force of these cars when placed with other cars not having such brakes.

I have stated that for freight-trains greater slack and heavier weights are required, in consequence of a greater number of cars forming the train, and having more slack between them.

At the left, in Figs. 1 and 2, the branch cord $v$ is shown separate and much longer, and the weight Z is heavier, and adapted for light and loaded cars by an attachable weight, Z', which arrangement carries an increased number of pulleys, and thereby lessens the pull required to operate the brakes of the cars forming the train.

The winding-hub $h$ is supported and turns upon a hollow pin, $k$, the top of which is closed by a cap-pin. This construction allows the seat and bearings for the winding-wheel and its hub to be oiled, and to exclude the dust therefrom.

It will be understood that the brakes are released by simply relaxing the train-cord, which is then drawn back by the weight attached to it at the rear end of the train. The weights of each car, however, assist in this operation, and the brakes are correspondingly released as the train-cord and brake-weights settle back to their resting positions. In practice the weights are arranged in suitable casings at one end of each car, so as to operate above the floor.

It is obvious that the winding-wheel $j$ $h$ is adapted to be turned in either direction to apply the friction-wheels, whether the cars are running backward or forward, as the connections and operation of the several parts of the brake produce the same effect in either case.

I claim—

1. The cross-levers N N, their flexible evener-connection p, and their winding-connection u, in combination with a winding-wheel, j h, adapted to be turned in either direction to apply the friction-wheels, as herein set forth.

2. The combination, in a friction power-brake, of the axle and arbor friction-wheels A and B, the arbor-lever E, and the arbor-pinion I with the winding device and its connecting-gear, adapted for operation substantially as herein set forth.

3. The friction-wheel hub or web e, fixed upon the arbor D, and the frictional rim-surface B, fixed by screw-bolts to said web, in combination with the arbor D and the friction-wheel A, the arbor being removable from its hangers, and the friction-surface from the arbor-web, as set forth.

4. The friction-wheel arbor D, movable at its frictional end, in combination with the bearing-box a at its fixed end, secured by a flanged base-plate, b, to admit of removal and displacement.

5. The frame or housing, consisting of the hanger G, the cap or hood $G^2$, the sleeve-bearing K, and the bearing l, in combination with the winding-wheel and its operating-gear, as set forth.

6. The combination, with the winding device, of the evener-bar L, the cross-levers N N, and the brake-shoe connections, adapted for joint operation with the friction-wheels A and B, substantially as herein set forth.

7. The combination, with the friction-wheels A and B of a friction-brake, of a winding-wheel, j h, having top radial ribs n n n', of varying height, for the purpose stated.

8. The combination, with the friction-wheels A and B of a friction-brake, of the winding-wheel j, having a hollow hub, h, its hollow securing-pin k, and the securing eyed cross-pin m, to which the winding-chain is connected, as herein set forth.

9. The winding-wheel j h, the fixed end of the friction-wheel arbor D, the gear g f, and the bearings of these several parts arranged and supported in the hanger-frame G, in combination with the bridge-timbers H, to which said frame is secured, as herein set forth.

10. The combination, with the car-wheel and the axle bearing box evener-bar S, of a brake-shoe, its lever, and intermediate connecting devices, operating to apply the braking force upon the top of the tread of said wheel, substantially as herein set forth.

11. The brake-shoe s, arranged upon the top of the tread of the wheel, in combination with the downwardly-curved levers Q, the elbow-lever P, pivoted to one of said levers Q, and the adjustable rod or bar T, connecting one of said levers with said elbow-lever, the long end of which connects with the winding devices, whereby the brake-levers are raised and lowered at their short or shoe ends.

12. The brake-shoes arranged to operate upon the top of the wheels, in combination with the curved levers Q Q, the axle evener-bars S, and the standards R, supporting said brake-levers, whereby the brake-shoes are maintained an equal distance from the axles, regardless of the action of the truck-supporting springs.

13. The brake-lever Q, having an under inclosing-recess, the brake-shoe s, having lugs inclosed by said recess, and the eyed pin t, jointed to said lugs within said recess and secured by a top nut, as and for the purpose set forth.

14. The combination, with the train-cord U and the branch line v, of the eyed brake-lever, connecting-rod y, and the intermediate flexible connection $w^2$ and its pulley-blocks w and $w^1$, operating with said branch cord, for the purpose stated.

15. The combination, with the train-cord U, the branch line v, having a knot, z', and an intermediate connection with the winding device, and carrying the weight x, of an automatic pawl or detent, z, arranged for operation between the train-cord connection and said weight, for the purpose stated.

16. The combination, with the train-cord U, the branch line v, its weights x, and brake-connecting devices, of the supplemental suspended weight $x^1$, for the purpose described.

In testimony that I claim the foregoing I have affixed my signature in the presence of two witnesses.

W. H. WARD.

Witnesses:
A. E. H. JOHNSON,
J. W. HAMILTON JOHNSON.